United States Patent
Numata et al.

(10) Patent No.: US 6,436,574 B1
(45) Date of Patent: Aug. 20, 2002

(54) NONAQUEOUS ELECTROLYTE SECONDARY BATTERY

(75) Inventors: Tatsuji Numata; Chika Kambe; Mikio Watanabe, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/556,514

(22) Filed: Apr. 21, 2000

(30) Foreign Application Priority Data

Apr. 26, 1999 (JP) ............................................. 11-117879

(51) Int. Cl.⁷ ................................................ H01M 4/58
(52) U.S. Cl. ................................ 429/218.1; 429/231.95
(58) Field of Search ............................. 429/218.1, 322, 429/323, 224, 231.95

(56) References Cited

U.S. PATENT DOCUMENTS

| | | | |
|---|---|---|---|
| 5,609,975 A | * | 3/1997 | Hasegawa et al. |
| 5,620,812 A | * | 4/1997 | Tahara et al. |
| 5,631,105 A | * | 5/1997 | Hasegawa et al. |
| 6,103,421 A | * | 8/2000 | Torata et al. |
| 6,235,427 B1 | * | 5/2001 | Idota et al. |
| 6,265,107 B1 | * | 7/2001 | Shimizu et al. |

FOREIGN PATENT DOCUMENTS

| | | |
|---|---|---|
| JP | 06-150928 | 5/1994 |
| JP | 7-153496 | 6/1995 |
| JP | 9-147859 | 6/1997 |

* cited by examiner

*Primary Examiner*—Tom Dunn
*Assistant Examiner*—Colleen P. Cooke
(74) *Attorney, Agent, or Firm*—Sughrue Mion, PLLC

(57) ABSTRACT

A nonaqueous electrolyte secondary battery uses a lithium manganese composite oxide as its positive electrode active material, and is improved in cycle life at a high temperature, and also improved in capacity retention properties. A negative electrode active material of the battery is capable of doping and undoping a lithium ion. The buttery contains in its inside at least one of: an oxide of at least one element selected from the group consisting of La, Sr, Nd, and Sm; a carbonate of at least one element selected from the group consisting of La, Sr, Nd, and Sm; and, a composite oxide of manganese combined with at least one element selected from the group consisting of La, Sr, Nd, and Sm. The battery uses an electrolyte, the electrolyte containing $LiPF_6$ or $LiBF_4$ as its supporting salt.

3 Claims, No Drawings

US 6,436,574 B1

NONAQUEOUS ELECTROLYTE SECONDARY BATTERY

BACKGROUND OF THE INVENTION

1. Field of the Invention

The present invention relates to a nonaqueoue electrolyte secondary battery using a negative and a positive electrode, wherein: the negative electrode has its active material composed of metallic lithium, a lithium alloy, a carbonaceous material capable of doping and undoping a lithium ion, or like materials; and, the positive electrode has its active material composed of an oxide compound such as lithium manganese composite oxides or like materials. More particularly, the present invention relates to a nonaqueous electrolyte secondary battery, which is improved in: cycle life; charge and discharge properties at a high temperature; and, capacity retention properties thereof.

2. Description of the Related Art

A nonaqueous electrolyte secondary battery, for example such as a lithium ion secondary battery or a like, which is of an enclosed type, small in size and large in electric capacity, is used as a main power source for various electric and electronic appliances such as portable telephone sets, laptop computers, camcorders, or a like.

The nonaqueous electrolyte secondary battery is large in energy density (i.e., discharge capacity) per unit volume or weight, and capable of supplying a relatively high voltage, compared with a conventional aqueous electrolyte secondary. Consequently, the nonaqueous electrolyte secondary battery is expected to be widely used as a main power source not only for small-sized instruments, but also for large-scale plants.

In a so-called "lithium ion battery": its negative electrode uses an active material such as a carbonaceous material or a like which is capable of doping and undoping a lithium ion; and, its positive electrode uses an active material, which is composed of a composite oxide of a transition metal combined with lithium. The negative and the positive electrode of the lithium ion battery are constructed of a negative and a positive current collecting strip element, respectively, wherein the strip elements are laminated through a separator interposed therebetween to form a current collector assembly which is coated with a suitable jacket material. It is also possible to form the current collector assembly by spirally winding the negative and positive collecting strip elements together with the separator interposed therebetween, wherein the current collector assembly thus formed is housed in a battery container, and thereby producing a battery product.

As a positive electrode active material of such a lithium ion secondary battery, there is a lithium manganese composite oxide, which is known in the art together with a lithium cobalt composite oxide. It is well known in the art that: when used at a temperature of from 40 to 60° C. and subjected to a repetition of charge and discharge operations, the lithium ion secondary battery employing the lithium manganese composite oxide has its charge and discharge cycle life considerably reduced in comparison with that employing the lithium cobalt composite oxide.

The problem to be solved by the present invention is as follows: namely, in order to solve the above problem of the battery which employs the lithium manganese composite oxide as its positive electrode active material, Japanese Laid-Open Patent Application No. Hei 7-153496 teaches to add, to the lithium manganese composite oxide, at least one compound selected from the group consisting of BaO, MgO, and CaO, and thereby preventing a manganese ion from dissolving into an electrolytic solution of the battery.

However, it is to be supposed that a reduction in the charge and discharge cycle life and deterioration in capacity retention properties of a lithium ion secondary battery (which employs the lithium manganese composite oxide, for example such as lithium manganate or like as its positive electrode active material) are caused by: deterioration in the positive electrode active material due to the dissoltion of the manganese ion from the lithium manganate; deposition of the thus dissolved manganese ion onto the surface of each of the negative electrode and the separator to plate the same surface; and, deterioration of the electrolytic solution of the battery. Consequently, it is difficult even for the above teaching of the Japanese Laid-Open Patent Application No. Hei 7-153496 to sufficiently solve the problem just mentioned above.

SUMMARY OF THE INVENTION

In view of the above, it is an object of the present invention to provide a nonaqueous electrolyte secondary battery, which is excellent in its charge and discharge cycle characteristics, its capacity retention properties, and further in its safety in use.

According to a first aspect of the present invention, there is provided:

in a nonaqueous electrolyte secondary battery using a positive electrode active material, a negative electrode active material, and a nonaqueous electrolyte, wherein the positive electrode active material is a lithium manganese composite oxide, and the negative electrode active material is capable of doping and undoping a lithium ion, the improvement in its inside:

an oxide of at least one element selected from the group consisting of La, Sr, Nd, and Sm.

According to a second aspect of the present invention, there is provided:

in a nonaqueous electrolyte secondary battery using a positive electrode active material, a negative electrode active material, and a nonaqueous electrolyte, wherein the positive electrode active material is a lithium manganese composite oxide, and the negative electrode active material is capable of doping and undoping a lithium ion, the improvement comprising in its inside:

a carbonate of at least one element selected from the group consisting of La, Sr, Nd, and Sm.

According to a third aspect of the present invention, there is provided:

in a nonaqueous electrolyte secondary battery using a positive electrode active material, a negative electrode active material, and a nonaqueous electrolyte, wherein the positive electrode active material is a lithium manganese composite oxide, and the negative electrode active material is capable of doping and undoping a lithium ion, the improvement comprising in its inside:

a composite oxide of manganese combined with at least one element selected from the group consisting of La, Sr, Nd, and Sm.

In the foregoing, the preferable mode is one wherein the oxide, the carbonate or the composite oxide is contained in the positive electrode active material.

Also, the preferable mode is one wherein the nonaqueous electrolyte contains at least one compound selected from the group consisting of $LiClO_4$, $LiI$, $LiPF_6$, $LiAlCl_4$, $LiBF_4$, $CF_3SO_3Li$ as its supporting salt.

Furthermore, the preferable mode is one wherein: the nonaqueous electrolyte is prepared by dissolving the supporting salt in a nonaqueous solvent, wherein concentration of the supporting salt in the nonaqueous solvent is within a range of from 0.8 to 1.5 mol/l.

DETAILED DESCRIPTION OF THE PREFERRED EMBODIMENTS

The best modes for carrying out the present invention will be described in detail using embodiments of the present invention.

Present inventors have found that: in a nonaqueous electrolyte secondary battery (hereinafter may also be referred to as battery), it is possible to improve the battery in its charge and discharge cycle characteristics even when the battery is used at a high temperature, provided that the battery contains in its inside at least one of a predetermined oxide, a predetermined carbonate, and a lithium manganese composite oxide which is to be contained in its positive electrode active material, wherein the battery satisfies at least one of the following three conditions: that the predetermined oxide is an oxide of one element selected from the group consisting of La, Sr, Nd, and Sm; that the predetermined carbonate is a carbonate of one element selected from the group consisting of La, Sr, Nd, and Sm; and, that the lithium manganese composite oxide is a composite oxide of manganese combined with one element selected from the group consisting of La, Sr, Nd, and Sm. In the battery having the above construction, preferably an electrolyte of the battery contains $LiPF_6$ or $LiBF_4$ as its supporting salt.

It is possible to prepare the lithium manganese composite oxide by mixing a source material of lithium with a source material of manganese to prepare a mixture thereof and firing the mixture in an oxidizing atmosphere, wherein the lithium manganese composite oxide is used as the positive electrode active material of the nonaqueous electrolyte secondary battery of the present invention. In this case, it is preferable to use raw materials, which permit compounds other than lithium oxides to evaporate and escape as gases in firing, wherein the compounds mentioned above are produced when raw materials such as oxides, nitrates, hydroxides, or like are fired.

As the source material of manganese, it is possible to use various manganese compounds, for example such as: manganese oxides such as electrolytic manganese dioxide (EMD); $Mn_2O_3$., $Mn_3O_4$, CMD, or like; and, manganese salts such as manganese carbonate, manganese oxalate, or like. However, in view of: easiness in setting a composition ratio of lithium to manganese; the battery's energy density per unit volume based on a bulk density in its electrode material; easiness in industrial synthesis and handling of the electrode material in mass-production; possible emission of toxic substances; manufacturing costs; or, like factors, it is most preferable to combine the lithium carbonate with the electrolytic manganese dioxide in practice. The electrolytic manganese dioxide is preferably prepared by the chemical reaction (i.e., neutralization) of an acid with ammonia. Particularly, one containing a sulfate group of less than 1.6 wt. % is preferable, and one containing an ammonium group of less than 0.1 wt. % is also preferable.

As for a composition ratio of lithium to manganese (i.e., Li/Mn), it is preferable that the composition ratio is within a range of from 0.54 to 0.625 in molar ratio. More particularly, it is preferable that a mole number (x) of lithium in lithium manganate ($Li_xMn_2O_4$) which eventually form the positive electrode active material is within a range of from 1.08 to 1.25 in moles.

Further, it is also preferable that a content of carbon in lithium manganate thus obtained is within a range of from 0.005 to 0.003% by weight.

Prior to a mixing step of starting materials, preferably performed are: a pulverization processing step of a source material of lithium such as lithium carbonate or like; and, a classification processing step of a source material of manganese such as electrolytic manganese dioxide or like, so that the entire process is improved in chemical reactivity, which enables the lithium manganate having a desired particle size to be effectively produced.

In Japanese Laid-Open Patent Application No. Hei 9-147859, the present inventors have disclosed that: "the particle size of lithium manganate thus produced is dependent on the particle size of the electrolytic manganese dioxide still not fired; synthesis of lithium manganate having a desired particle size is realized by performing the classification processing step of the electrolytic manganese dioxide still not fired; and, the chemical reactivity of the entire process is improved by performing the pulverization processing step of the source material of lithium such as lithium carbonate and by uniformly distributing the thus finely pulverized lithium carbonate powder around the particles of the electrolytic manganese dioxide, wherein the lithium carbonate powder is pulverized as finely as possible."

Preferably, the lithium manganate used as the positive electrode active material in the nonaqueous electrolyte secondary battery of the present invention has: its BET (Bernauer-Emmett-Teller) surface/volume ratio be within a range of from 0.2 to 1.0 $m^2$/g; its particle diameter be within a range of from 5 to 50 $\mu$m; and, its median particle diameter ($D_{50}$) be within a range of from 5 to 18 $\mu$m.

Preferably, the classification processing step described above is performed in a manner such that the electrolytic manganese dioxide serving as a source material of manganese has its particle diameter be within a range of from 5 to 50 $\mu$m, and its median particle diameter ($D_{50}$) be within a range of from 5 to 18 $\mu$m.

On the other hand, preferably lithium carbonate serving as a source material of lithium has its median particle diameter ($D_{50}$) be less than or equal to 8 $\mu$m, which enables an entire chemical reaction to be smoothly and uniformly performed without producing any residuary substance such as $Mn_2O_3$, or like unreacted manganese oxides.

Further, in mixing the electrolytic manganese dioxide with lithium carbonate, lithium carbonate is effectively brought into contact with the electrolytic manganese dioxide to prepare a powder mixture. Further, in order to make it easy to handle the powder mixture in firing, a suitable binder such as polyvinyl alcohol or like is added to the powder mixture so that the powder mixture is formed into green pellets. At this time, a desired value of a median diameter ($D_{50}$) of the green pellets thus formed is within a range of from 0.2 to 2 mm in view of: a presence or absence of powder dust; a yield of the thus formed green pellets; variation in size of the green pellets; an apparent density of the green pellets; easiness in cleaning an apparatus for forming the green pellets; uniformity in chemical reaction; a necessary period of time in chemical reaction; or, like factors.

Then, a green compact of the mixed powder having been formed into the green pellets are fired preferably at the following predetermined firing temperature T (° C.) in an oxidizing atmosphere in which a flow rate of an oxygen gas is set at a value within a range of from 0.5 to 5 liters per minute:

Preferably, a range of the firing temperature T (° C.) is defined by a following equation in a condition in which lithium compound (lithium carbonate or like) is mixed with manganese compound (electrolytic manganese dioxide or like) at a molar ratio ([Li]/[Mn]) of within a range of from 0.54 to 0.625:

$$-772x+1506 \leq T \leq -769x+1720 \quad 1.08 \leq x \leq 1.25$$

where the molar ratio ([Li]/[Mn]) is represented by x/2.

Although a necessary period of firing time of the green pellets depends on the green pellet forming conditions, firing temperature of the green pellets, and firing atmospheres used for the green pellets, it is sufficient to set the period of firing time at a value within a range of from 4 to 24 hours since the chemical reaction of the green pellets is completed in 4 to 12 hours in firing.

A 99.9% of the thus fired and obtained lithium manganate forms pellets having a particle size of from 5 to 50 $\mu$m, which is accompanied with fine particles having a particle size of less than 1 $\mu$m. Consequently, it is preferable to remove such fine particles mixed with the pellets of lithium manganate using an air classifier.

The battery of the present invention may contain in its inside at least one of following additives: an oxide of at least one element selected from the group consisting of La, Sr, Nd, and Sm; a carbonate of at least one element selected from the group consisting of La, Sr, Nd, and Sm; and, a composite oxide of manganese combined with at least one element selected from the group consisting of La, Sr, Nd, and Sm.

More specifically, elements thus selected in the above may be $La_2O_3$, SrO, $Nd_2O_3$, $Sm_2O_3$, $La_2O(CO_3)_3$, $SrCO_3$, $Nd_2(CO_3)_3$, $Sm_2(CO_3)_3$, or, $LaMnO_3$, $SrMnO_3$, $NdMnO_3$, and $SmMnO_3$. It is preferable to use these powder materials.

In operation, carbonates may produce carbon dioxide when an abnormal chemical reaction occurs in the battery to abnormally increase a temperature of the battery, wherein the thus produced carbon dioxide may actuate a pressure relief valve of the battery to promptly release an interior pressure of the battery, and may cut off communication between the battery elements and a battery header portion.

Preferably, based on 100 parts by weight of the positive electrode active material, the amount of each of the additives such as the oxides, carbonates, and the composite oxides is set to more than 0.2 part by weight but less than 13.0 parts by weight, and more preferably set to more than 0.3 parts by weight but less than 10.0 parts by weight, and most preferably set to more than 0.5 parts by weight but less than 5.0 parts by weight.

In the above, when the amount of the additive is more than 13.0 parts by weight, the amount of the active material of the battery is reduced, which causes a reduction in battery capacity. Consequently, such amount of the additive is not adequate. On the other hand, when the amount of the additive is less than 0.2 parts by weight, it is not possible for the additive to effectively function in the battery.

Although it is necessary to have the additive contained inside the battery, it is preferable to have the additive contained in the positive electrode active material. In this case, it is preferable to mix the additive with raw materials of the positive electrode active material in its preparation process.

Although additives of the present invention (which additives are at least one of: the oxide of at least one element selected from the group consisting of La, Sr, Nd, and Sm; the carbonate of at least one element selected from the group consisting of La, Sr, Nd, and Sm; and, the composite oxide of manganese combined with at least one element selected from the group consisting of La, Sr, Nd, and Sm) may be used in the nonaqueous electrolyte secondary batteries containing various types of electrolytic solutions, it is preferable for the battery of the present invention to use an electrolytic solution containing $LiPF_6$ or $LiBF_4$ as its supporting salt.

When such electrolytic solution containing $LiPF_6$ or $LiBF_4$ is used in the battery, there is a danger that $LiPF_6$ or $LiBF_4$ of the electrolytic solution reacts with moisture to form an acid, wherein the moisture is contained in the raw materials or introduced into the battery from air during a manufacturing process of the battery. The thus produced acid causes the manganese contained in the lithium manganese composite oxide to dissolve into the electrolytic solution, and thereby causing deterioration of the lithium manganese composite oxide in crystal structure. Due to such dissolution of manganese, there is a danger that the thus dissolved manganese is deposited on a surface of a negative electrode active material and also on inner surfaces of a separator, and thereby impairing the battery in chemical reaction. Particularly, dissolution of manganese into the electrolytic solution due to a presence of the acid becomes increasingly serious as the operating voltage of the battery becomes higher. Consequently, it is to be supposed that the dissolution of manganese into the electrolytic solution seriously affects charge and discharge cycle characteristics of the battery when the battery is used at a high temperature.

With respect to: the oxide of at least one element selected from the group consisting of La, Sr, Nd, and Sm; and, the carbonate of at least one element selected from the group consisting of La, Sr, Nd, and Sm, there is no danger that such oxide and such carbonate seriously affect the battery in chemical reaction, and react with moisture, acid or like contaminants in the battery to produce a harmful substance which affects the battery in chemical reaction. As a result, it is possible for the battery of the present invention to remove any substance capable of forcing manganese to dissolve into the electrolytic solution of the battery. This makes it possible for the battery of the present invention: to keep its high charge and discharge capacities; to improve its cycle characteristics when it is used at the high temperature; and, to improve its capacity retention properties.

The substance capable of reacting with the acid and moisture inside the battery, for example such as the oxide and the carbonate both mentioned above may be disposed in any position inside the battery, in which position the substance may be brought into contact with the electrolytic solution of the battery. For example, it is possible to have the substance: mixed with the electrolytic solution; dissolved or dispersed in the electrolytic solution; or, contained in the positive electrode of the battery. Most preferably, the substance is mixed with the positive electrode active material in preparation of the positive electrode, and used therewith.

In preparing the positive electrode of the battery of the present invention, a powder of lithium manganese composite oxide is mixed with an electric conductivity imparting agent, a binder, and a solvent which is capable of dissolving the binder therein, so that a slurry is prepared which is then applied to a current collecting element, wherein the current collecting element is constructed of an aluminum foil or like. After application of the slurry thereto, the current collecting element is dried to remove the solvent applied thereto. The thus dried current collecting element is pressed by means of a pair of rollers or like press machines, so that a current collecting film product is produced.

The electric conductivity imparting agent mentioned in the above is known in the art, which agent may be at least one of: carbon black, acetylene black, natural graphite, artificial graphite, carbon fibers, or like, wherein these substances are large in electric conductivity, and chemically stable in the positive electrode. Consequently, it is possible to use these substances in the battery of the present invention. Further, in addition to the above substances, it is also preferable to use, as a binder, polytetrafluoroethylene (PTFE), polyvinylidene fluoride (PVDF), or like fluorocarbon resins. It is more preferable to use the polyvinylidene fluoride (PVDF) which may easily dissolve in the solvent, and is easily mixed with the slurry.

On the other hand, the electrolytic solution used in the present invention is prepared by dissolving a supporting salt in a nonaqueous solvent. As such the nonaqueous solvent, it is possible to use a carbonate-based solution, a chlorinated hydrocarbon, an ether, a ketone, a nitorile, or like. It is possible to use a mixed solution, which is prepared by mixing: at least one compound selected from the group consisting of various solvents high in dielectric constant, for example such as ethylene carbonate (EC), propylene carbonate (PC), γ-butyrolactone (GBL), or like; with at least one compound selected from the group consisting of various solvent low in viscosity, for example such as diethyl carbonate (DEC), dimethyl carbonate (DMC), ethyl methyl carbonate (EMC), esters, or like. Of these mixed solution, preferable ones are: a mixture of ethylene carbonate and diethyl carbonate; and, a mixture of propylene carbonate and ethyl methyl carbonate.

As for the above-mentioned supporting salt, the salt may be at least one compound selected from the group consisting of $LiClO_4$, $LiI$, $LiPF_6$, $LiAlCl_4$, $LiBF_4$, $CF_3SO_3Li$, or like. The concentration of the supporting salt in the solvent is preferably within a range of from 0.8 to 1.5 mol/l.

In general, it is difficult to completely remove moisture from the nonaqueous solvent. Further, in manufacturing the battery, the solvent is prone to absorb moisture in the air. As a result, the supporting salt often reacts with the moisture to considerably produce a hydrogen ion.

Particularly, $LiPF_6$ and $LiBF_4$ react with moisture to considerably produce the hydrogen ion, which makes the electrolytic solution acidic. In this respect, the battery of the present invention contains in its inside at least one of: the oxide of at least one element selected from the group consisting of La, Sr, Nd, and Sm; the carbonate of at least one element selected from the group consisting of La, Sr, Nd, and Sm; and, the composite oxide of manganese combined with at least one element selected from the group consisting of La, Sr, Nd, and Sm. Consequently, in the battery of the present invention, reaction of the supporting salt with moisture is effectively suppressed due to a presence of at least one of the oxide, carbonate and the composite oxide described above, which makes it possible to effectively suppress a dissolution of manganese from the lithium manganese composite oxide.

As for the negative electrode active material, such active material may be either lithium, a lithium alloy or a material capable of doping and undoping a lithium ion. Further, the negative electrode active material may be a carbonaceous material and a composite oxide of a metal, wherein the carbonaceous material is a graphite, an amorphous carbon or like.

The separator may be constructed of a woven fabric, a nonwoven fabric, a porous film or membrane, or like. Of these materials, preferable ones are porous membranes made of polypropylene or polyethylene since these polymers make it possible to reduce the membranes in thickness, and also make it possible to increase the membranes in surface area, physical strength and in resistance to chemicals.

In the battery of the present invention, the negative and the positive electrode are laminated through the separator interposed therebetween to form a collector assembly which is coated with a suitable jacket material. It is also possible to form the collector assembly by spirally winding the negative and the positive electrode together with the separator interposed therebetween, wherein the collector assembly thus formed is housed in a battery container, and thereby producing a completed battery product which may be of a laminated type, a cylindrical type, a paper type, a coin type, or like types.

The present invention will now be illustrated in greater detail with reference to Examples, but not limited to these Examples, and any modifications can be made within the spirit of the present invention.

EXAMPLE 1

Synthesis of lithium manganese composite oxide "A"

Used as the electrolytic manganese dioxide was one having been neutralized with a use of ammonia in a manufacturing process to have a 1.1 wt. % of sulfate group together with a 0.08 wt. % of ammonium group. This one was classified using an air classifier to have a BET surface area to volume ratio of $28.5 m^2/g$.

On the other hand, lithium carbonate was pulverized so as to have a median particle diameter ($D_{50}$) of 1.4 μm ($D_{25}$=1.0 μm, $D_{75}$=1.8 μm).

Then, thus obtained raw materials were mixed with each other at a molar ratio of 2Li/Mn=1.10 to prepare a powder mixture to which a 5% polyvinyl alcohol solution was gradually added to obtain a slurry. Then, the slurry was applied an entire surface of a green pellet made of the electrolytic manganese dioxide (hereinafter referred to as the EMD pellet). After application of the slurry to the surface of the EMD pellet, the EMD pellet had a median diameter ($D_{50}$) of 0.8 mm.

Thus obtained EMD pellet was then fired at a temperature of 800° C. for 12 hours in an oxidizing atmosphere to produce a fired pellet made of lithium manganate, wherein the fired pellet having a particle size of less than or equal to 1 μm was removed using the air classifier.

Preparation of Cylindrical Type Battery

Preparation of the Positive Electrode

| | |
|---|---|
| Lithium manganese composite oxide "A" | 88.2 parts by weight |
| Oxide, carbonate in Table 1 | 1.8 parts by weight |
| Carbon black | 6.0 parts by weight |
| Polyvinylidene fluoride | 4.0 parts by weight |

A 100 parts by weight of a mixture of the above ingredients was dispersed in 61 parts by weight of N-methyl-2-pyrrolidone (NMP) to prepare a slurry. Then, the slurry was applied to a surface of an aluminum foil having a thickness of 20 μm to prepare a positive electrode.

Preparation of the Negative Electrode

| | |
|---|---|
| Carbonaceous material ("MCMB": produced by OSAKA GAS CO., LTD) | 90.0 parts by weight |
| Carbon black | 2.0 parts by weight |
| Polyvinylidene fluoride | 8.0 parts by weight |

A 100 parts by weight of a mixture of the above ingredients was dispersed in 117 parts by weight of N-methyl-2-pyrrolidone (NMP) to prepare a slurry. Then, the slurry was applied to a surface of a copper foil having a thickness of 15 μm to prepare a negative electrode.

The positive and the negative electrode thus obtained were laminated through a porous polyethylene film having a film thickness of 25 μm interposed therebetween to form a current collector assembly. Then, this assembly was spirally wound, and housed in a battery container of 18650 type having a diameter of 18 mm and a height of 65 mm. This battery container was filled with an electrolytic solution, which was a solvent of ethylene carbonate:diethyl carbonate=50:50 (volume ratio) containing therein $LiPF_6$ as a supporting salt. After filled with the electrolytic solution, the battery container was completely sealed.

A battery product thus obtained was evaluated in performance by a following evaluation method. Evaluation results of battery performance are shown in the following Table 1.

Re: Comparative Example 1

Preparation of Comparative Test Battery

| | |
|---|---|
| Lithium manganese composite oxide "A" | 90.0 parts by weight |
| Carbon black | 6.0 parts by weight |
| Polyvinylidene fluoride | 4.0 parts by weight |

A 100 parts by weight of a mixture of the above ingredients was dispersed in 61 parts by weight of N-methyl-2-pyrrolidone (NMP) to prepare a slurry. Then, the slurry was applied to a surface of an aluminum foil having a thickness of 20 μm to prepare a positive electrode. With the exception of the above, the method for manufacturing a comparative test battery was essentially the same as that of the Example 1. The comparative test battery thus obtained was evaluated by a following evaluation method as is in the Example 1. Evaluation results are shown in the following Table 1.

TABLE 1

| Additives | Impedance after 500 cycles (mΩ) | Cycle deterioration rate (%) After 200 cycles | Cycle deterioration rate (%) After 500 cycles | Capacity retention rate after kept at high temperature (%) |
|---|---|---|---|---|
| None | 72 | 65 | 42 | 68 |
| $La_2O_3$ | 40 | 85 | 65 | 85 |
| $SrCO_3$ | 36 | 89 | 72 | 87 |
| $Nd_2O_3$ | 37 | 87 | 66 | 83 |
| $Sm_2O_3$ | 41 | 83 | 63 | 86 |

EXAMPLE 2

Comparative Example 2

In order to investigate suppressing characteristics of each oxide and carbonate each containing at least one element selected from the group consisting of La, Sr, Nd, and Sm (which characteristics are for suppressing the production of an acid from each of the oxide and the carbonate), 90 parts by weight of lithium manganese composite oxide "A" was mixed with 10 parts by weight of at least one of the oxide and the carbonate each containing at least one element selected from the group consisting of La, Sr, Nd, and Sm to prepare a mixture. Five grams of the thus prepared mixture and a solvent of ethylene carbonate:diethyl carbonate=50:50 (volume ratio) containing therein $LiPF_6$ as a supporting salt were filled in a container made of propylene, then sealed up therein, and thereafter stored at a temperature of 85° C. for 10 days in such a sealed condition.

A concentration of lithium manganese in the liquid contained in the thus sealed container was measured by a so-called "ICP (Inductively Coupled Plasma) emission spectroscope analysis" process. The thus measured concentration is shown in the following Table 2, together with a concentration of hydrofluoric acid measured by an ion-chromatography process.

TABLE 2

| Additives | Concentration of manganese (ppm) | Concentration of hydrofluoric acid (ppm) |
|---|---|---|
| None | 2000 | 250 |
| $La_2O_3$ | 1500 | 180 |
| $SrCO_3$ | 1200 | 100 |
| $Nd_2O_3$ | 1400 | 160 |
| $Sm_2O_3$ | 1300 | 120 |

The batteries according to the embodiment of the present invention, are high in capacity recovery rate after stored at a high temperature, which shows that the one is improved in its capacity retention properties.

Evaluation Method of Battery's Characteristics

1. Variations in Impedance After Completion of the Battery Cycle Test

In a condition in which seven pieces of batteries were stored at a temperature of 50° C., each of the batteries was charged at a charging rate of 1 C with a constant current. Then, after each of the batteries attained a potential of 4.2 volts, each of the batteries was charged for 2 hours at a constant voltage. After that, each of the batteries was discharged at a discharging rate of 1 C until the battery attained a potential of 3.0 volts, which was a target charge-termination potential. The number of the above charge and discharge cycles of each of the batteries reached 500 (cycles).

After completion of 500 cycles of charge and discharge operations of each of the batteries, each of the batteries was measured in impedance. This measurement was conducted using a potentiostat ("Potentiostat/galvanostat 2000": produced by TOHOGIKEN CO., LTD) and a frequency-characteristic analyzer ("FRA5020" of NF circuit block type) to measure a so-called "Cole-Cole's arc plot" in a condition in which: a measurement frequency is within a range of from 20 kHz to 1 Hz; a sweep frequency is a 100 steps per sweep; as for an integral condition, definite integral was executed three times in measurement; the thus measured results were shown as mean values of seven batteries.

2. Variations in Capacity Retention Rate Resulted from the Repetition of Cycles

In a condition in which four test batteries were kept at a battery temperature of 50° C., these batteries were charged with a constant current at a charging rate of 1 C. Then, after the batteries had attained a potential of 4.2 volts, a constant-voltage charging operation was performed for 2 hours with respect to each of the batteries. Then, at a discharging rate of 1 C the batteries were subjected to a discharge operation with a target discharge-termination voltage of which was set at a potential of 3.0 volts. These charge and discharge operations were repeated a plurality of times, i.e., 200 cycles and 500 cycles, respectively, where the battery capacity after completion of the 200-th cycle and that after completion of the 500-th cycle were shown in a ratio of "the battery capacity after completion of the first cycle" to "each of those after completion of the 200-th and the 500-th cycle".

3. Capacity Retention Rate at High Temperatures

The batteries were charged with a constant current at a charging rate of 2 C until they attain a potential of 4.2 volts. After that, they were charged with a constant voltage of 4.2 volts for 2 hours, and then kept at a temperature of 60° C. for four weeks. After that, the batteries were subjected to a discharge operation, which was performed at a discharging rate of 0.2 C and had its target discharge-termination voltage set at a potential of 3.0 volts, so that the batteries were measured in discharge capacity, wherein the capacity retention rate was so defined to be a ratio (%) of the charge capacity to the discharge capacity.

The effect of the present invention is as follow:

In the battery of the present invention in which the lithium manganese composite oxide is used as its positive electrode active material, it is possible to reduce the amount of manganese dissolving from the lithium manganese composite oxide. This makes it possible to suppress variations in concentration of lithium ions in the electrolytic solution. Consequently, it is possible to improve the battery in its charge and discharge cycle, particularly, in its charge and discharge cycle life at high temperatures, and in its capacity retention properties.

It is thus apparent that the present invention is not limited to the above embodiments but may be changed and modified without departing from the scope and spirit of the invention.

Finally, the present application claims the Convention Priority based on Japanese Patent Application No. Hei 11-117879 filed on Apr. 26, 1999, which is herein incorporated by reference.

What is claimed is:

1. A nonaqueous electrolyte secondary battery comprising a positive electrode active material, a negative electrode active material and a nonaqueous electrolyte, wherein the positive electrode active material comprises a lithium manganese composite oxide, and the negative electrode active material is capable of doping and undoping a lithium ion:

wherein an oxide of at least one element selected from the group consisting of La, Sr, Nd, and Sm is physically mixed with said lithium manganese composite oxide in said positive electrode active material, whereby said oxide serves as an additive for preventing manganese from eluting out of said positive electrode active material.

2. The nonaqueous electrolyte secondary battery according to claim 1, wherein: a nonaqueous electrolyte contains at least one compound selected from the group consisting of $LiClO_4$, $LiI$, $LiPF_6$, $LiAlCl_4$, $LiBF_4$, $CF_3SO_3Li$ as its supporting salt.

3. The nonaqueous electrolyte secondary battery according to claim 2, wherein: said nonaqueous electrolyte is prepared by dissolving said supporting salt in a nonaqueous solvent, wherein concentration of said supporting salt in said nonaqueous solvent is within a range of from 0.8 to 1.5 mol/l.

* * * * *

UNITED STATES PATENT AND TRADEMARK OFFICE
CERTIFICATE OF CORRECTION

PATENT NO. : 6,436,574 B1
DATED : August 20, 2002
INVENTOR(S) : Tatsuji Numata, Chika Kambe and Mikio Watanabe It is certified that error appears in the above-identified patent and that said Letters Patent is hereby corrected as shown below:

Column 5,
Line 32, delete "$La_2O$" and insert -- $La_2$ --

Signed and Sealed this

Thirty-first Day of December, 2002

JAMES E. ROGAN
*Director of the United States Patent and Trademark Office*